June 15, 1926.
K. H. BROWNLEE
1,588,653
VENTILATOR FOR CLOSED VEHICLES
Filed Oct. 1, 1923
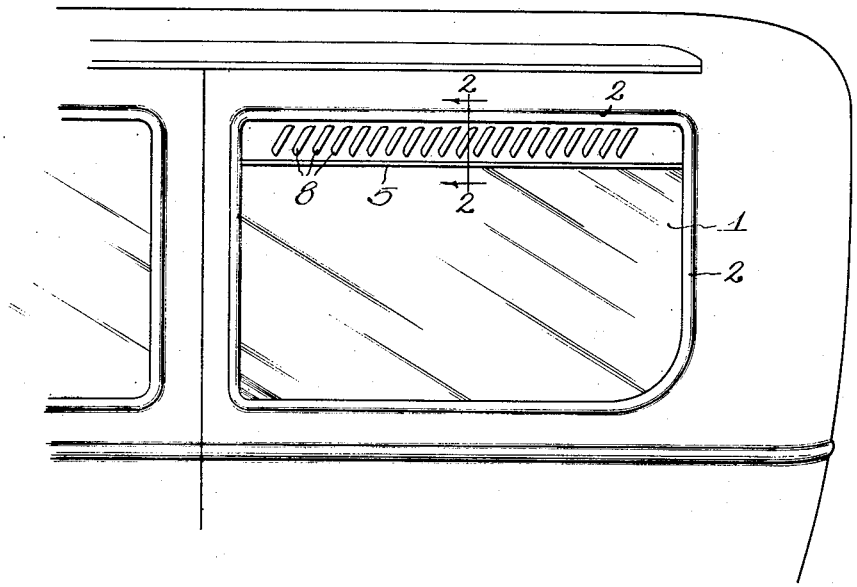
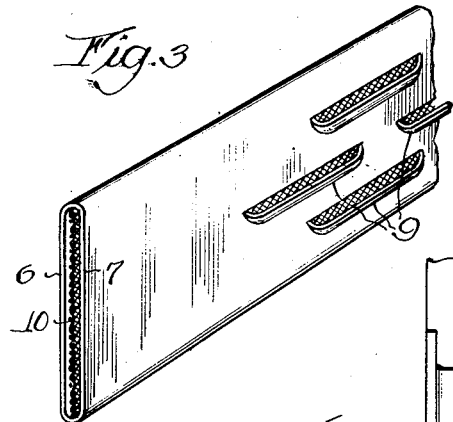
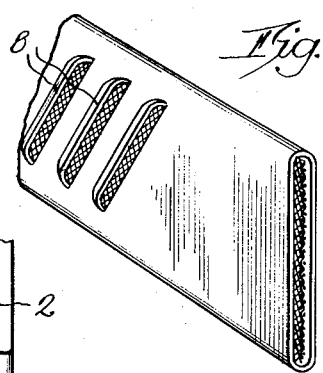
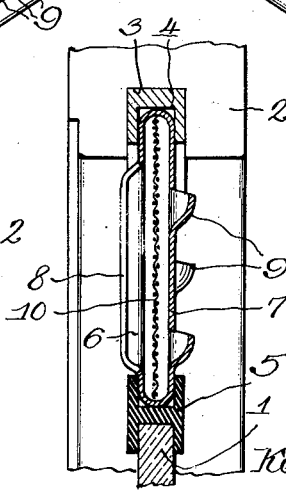
Inventor
Kenneth H. Brownlee, Patented June 15, 1926.

1,588,653

UNITED STATES PATENT OFFICE.

KENNETH H. BROWNLEE, OF EVANSTON, ILLINOIS.

VENTILATOR FOR CLOSED VEHICLES.

Application filed October 1, 1923. Serial No. 665,760.

This invention relates to improvements in ventilators for closed vehicles, and more particularly to a ventilator which may be removably installed in the window or door openings of closed automobile bodies having plate glass panels, adapted to be raised and lowered, by suitable devices designed for the purpose.

The object of the invention provides a practical and efficient ventilating device, which can be acquired at a moderate cost and readily inserted and removed without altering or mutilating any parts of the window.
A further object of the invention is to provide a ventilator which is wholly water tight and at the same time will function effectively to expel the foul air from the interior of the vehicle.
A preferred embodiment of the invention is disclosed in the accompanying drawings in which—

Figure 1 is a general view of the rear portion of the closed vehicle showing the ventilator as installed in one of the windows thereof.

Figure 2 is an enlarged detailed view in vertical section of the ventilator and adjacent parts of the vehicle window.
Figure 3 is a perspective view of an end portion of the ventilator showing the louver arrangement on the side facing inwardly, and, Figure 4 is a similar view in perspective showing the arrangement of the louvers on the exterior side of the ventilator.

As is well known, the common construction for closed vehicles is to provide windows fitted with panels of plate glass 1, which may be raised and lowered. A space or well is provided in the body and below the window, into which the glass can be lowered and concealed. Lifting devices operated from the interior of the body, are provided for raising and lowering the glass panels. A common type of lifting device permits the panel to be supported in any position of its vertical movement, for obvious reasons. For the purpose of this invention, it may be assumed that glass panel 1 is regulated by such a device, although the use of the ventilator is by no means dependent upon the character of lifting device used.
As shown in Figure 2, the window of an automobile body is constructed by surrounding the window opening with a frame 2, having a channel or rabbet 3 extending along the side and top faces. Within the rabbet is a felt lining strip 4 of V-shape, which serves as a cushioning material between the frame and the glass panel 1. As already suggested, the glass panel 1 is raised and lowered by a suitable regulating device and when in raised position its edges fit tightly within the channel formed by the felt lining 4.

Referring now to the ventilator, the same has the general appearance of an elongated flat tubular panel of substantially the same thickness as the glass panel and having a multitude of louvers on opposite sides thereof. As illustrative of its application to a vehicle body, it is shown (Fig. 1) as extending horizontally of the upper portion of the window, between the top rail and the upper edge of the glass panel.

In its preferred form the ventilator consists of a flat tubular member of say 2½ or 3 inches in width, and about ¼ of an inch in thickness, or equal to that of the glass panel. The length varies with the horizontal dimensions of the window to be fitted. The material is preferably a light sheet metal, such as aluminum which is bent in tubular form with parallel front and back walls 6 and 7 respectively, and rounded top and bottom edges. Formed in the front wall 6 of the ventilator is a plurality of louvers 8 extending substantially throughout the length of the strip and arranged in parallel relation with each other along lines oblique to the top and bottom edges of the ventilator, the angle between each louver and the longitudinal edges of the ventilator being approximately 30 degrees, although the exact inclination is not essential. The openings formed by these louvers face in the same direction and toward one end of the ventilator.

The inside or back wall 7 of the ventilator is provided with another set of louvers 9, arranged in quite a different manner, as clearly shown in Figure 3. These louvers are arranged in parallel rows extending longitudinally throughout the length of the ventilator, the louvers in each row being staggered with respect to those in the adjacent rows. Thus when the ventilator is installed these louvers 9 face inwardly and upwardly toward the top of the compartment to be ventilated. This feature is important for the following reasons: In the first place the foul air rises to the top of the compartment and hence the openings are properly positioned to withdraw the air from the space above rather than below the ventilator, and secondly, the upwardly facing openings avoid any air currents or drafts to be directed downwardly on the occupants of the vehicle, as well as prevents the entrance of snow or rain from the outside, these conditions being prevalent in stormy weather and particularly when the vehicle is not moving.

In the present disclosure three rows of these louvers 9 are shown as arranged in staggered relation. The openings formed thereby face in the same direction and transversely toward one of the edges of the ventilator, so that when the same is properly installed these openings are directed upwardly and toward the ceiling of the compartments being ventilated.

Within the space separating the two parallel walls of the ventilator is preferably mounted a strip of fine copper wire mesh 10, forming a screen extending parallel to said walls and spaced equidistantly from each. The screen is secured permanently in place and serves the usual purpose of eliminating dust and preventing the entrance of insects into the interior of the vehicle.

The ventilator is preferably installed in the manner shown in Figures 1 and 2, and as will be understood from the following: The glass panel 1 is lowered a sufficient distance to permit the ventilator to be introduced into the upper portion of the frame, with its upper edge fitting in the channel 3 in the top rail, and the ends fitting in the same manner in the side rails. Between the lower edge of the ventilator and the top edge of the glass panel is preferably inserted the rubber strip 5 having oppositely facing channels to receive the opposing edges of the ventilator and glass, the latter being raised as the final step in the installation, thus holding the ventilator in place.

In installing the ventilator it is important that the louvers are directed in the proper direction. As already indicated, the side having the oblique louvers 8, is faced outwardly, and the side having the transversely opening louvers 9 faced inwardly.

Moreover, the ventilator is so positioned that the outer louvers 8 face or open rearwardly of the vehicle and downwardly, as shown in Figure 1, and the louvers 9, on the inside face upwardly. It follows from this arrangement of the louvers that the ventilators act to draw the foul air from the interior of the vehicle rather than admit fresh air, this being the preferred system of ventilating since there are ample openings in the front part of the vehicle for the air to enter, as, for instance, about the edges of the wind shield. Thus it will be seen that in the forward movement of the vehicle, the air rushing by the openings formed by the louvers creates a suction, which draws the air from the interior of the vehicle body, and particularly from the upper portion or near the ceiling. This is desirable since the vitiated air is ordinarily warmer than the fresh air, and therefore rises, forming a strata below the ceiling. It may also be noted in connection with the outer louvers 8, that they are inclined forwardly from top to bottom, as well as opening to the rear. This prevents rain or snow from beating through the ventilator in severe weather.

There are other points to be emphasized in connection with the designing of the ventilators. In the first place, they are preferably installed in pairs, one in each corresponding window on opposite sides of the vehicle. Hence, to secure the same arrangement of louvers, each pair is made with the one or the other sets of louvers reversed, that is to say, they are made in "lefts" and "rights."

Another point is this: The ventilators are intended for installation in all makes of closed vehicles, and all sizes of windows, whether in body or door. Manifestly, the width of windows vary, and hence different lengths of ventilators must be provided. In a great many instances the difference in length is small, so that a standard length may be made with the intent that they will be cut to length by removing portions from the ends. For this reason it is preferred that the end portions be left blank for a distance of three or four inches to allow for shortening. Moreover, it is thought to improve the appearance by having uniform blank spaces separating the end louvers and the side rails of the windows. The ventilators are enamelled to harmonize with the color of the body and therefore give the appearance of being permanent panels, particularly since they fit snugly in place without any necessity for brackets or fixtures of any form. If desired, the ends of the ventilators can be fitted tightly in place, so that they can remain in position even though the window panel be lowered. Otherwise, they can be easily removed, and stored until needed.

The advantage of the type of ventilators herein disclosed not only resides in the effective system of ventilation that can be introduced, but in the ease and moderate cost of installation and the complete freedom from the necessity of altering or marring the body of the vehicle in order to apply them.

Having disclosed the preferred embodiment of the invention and its advantages, I claim:

1. A ventilator adapted to be removably fitted in a window frame of a closed vehicle and comprising a flat tubular panel having series of louvers extending substantially throughout the length thereof, one series opening parallel to the longitudinal edge of said panel and the other series opening toward one end thereof.

2. A ventilator for closed vehicles comprising a double walled panel adapted to be removably mounted within the window frame and in abutting engagement along one edge of the glass panel thereof, and having a series of louvers formed in the opposite walls thereof, said louvers being of a predetermined arrangement whereby those in the inner wall open upwardly and those in the outer wall open toward one end of the panel.

3. A ventilator for closed vehicles, comprising a double walled panel adapted to be mounted horizontally in the frame of a window and having louvers extending substantially the length of the walls thereof, the louvers in the inner wall opening toward the upper longitudinal edge of the panel and the louvers in the outer wall opening obliquely toward the rear end and lower longitudinal edge thereof.

4. A ventilator for closed vehicle windows comprising a relatively flat tubular panel, having a series of louvers extended lengthwise of one wall thereof, and opening toward one end of said panel and a series of louvers in the other wall thereof, opening toward one edge thereof, said panel being adapted to fit along one edge within the channel formed in the top rail of said window with its opposite edge in alignment with the adjustable glass panel of said window for abutting contact therewith.

5. A ventilator for closed vehicles comprising a relatively narrow panel adapted to be positioned horizontally in the frame of a window and in sealing contact along one edge with the glass panel thereof, said panel consisting of spaced inner and outer walls, there being formed in the outer wall a series of parallel louvers extending crosswise and oblique to the top and bottom edges of the panel and opening outwardly and louvers formed in the inner wall extending lengthwise of the panel and opening inwardly, said panel being positioned so that the openings formed by the outer louvers face rearwardly and downwardly and the openings formed by the inner louvers face upwardly.

6. In a ventilator for closed vehicles, comprising a flat tubular panel, adapted to be inserted in a window frame between the horizontal edge of the glass window panel and the opposite rail, said panel having louvers formed in the opposite walls thereof, the louvers in one wall being arranged transversely and the oblique to the longitudinal edges of the panel, and the louvers in the other wall being arranged parallel to said longitudinal edges, said panel being positioned in said window with the outer louvers facing rearwardly and downwardly and the inner louvers facing upwardly, with respect to the vehicle.

7. A ventilator of the character described, comprising a flat tubular panel adapted to be removably fitted within the window frame of a closed vehicle and in the plane of the adjacent glass panel thereof, said panel having series of louvers extending substantially throughout the length of the inner and outer walls thereof and arranged to promote the withdrawal of air from the interior of the vehicle in a downward direction through the louvers in the inner wall and laterally and toward the rear of the vehicle through the louvers in the outer wall 8. The combination with a ventilating panel for closed vehicles adapted to be inserted in a window frame between the edge of a glass panel and a rail parallel therewith of a strip of resilient material having channels facing in opposite directions and engaging the edges of said panels.

In witness whereof, I hereunto subscribe my name this 28th day of September, A. D., 1923.

KENNETH H. BROWNLEE.